United States Patent
Matsuda

(10) Patent No.: US 8,593,664 B2
(45) Date of Patent: Nov. 26, 2013

(54) IMAGE PROCESSING APPARATUS, IMAGE PROCESSING SYSTEM, AND PROGRAM FOR SPECIFYING DESTINATIONS FOR IMAGE DATA TRANSMISSION

(75) Inventor: Hideyuki Matsuda, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1119 days.

(21) Appl. No.: 11/853,131

(22) Filed: Sep. 11, 2007

(65) Prior Publication Data

US 2008/0062471 A1 Mar. 13, 2008

(30) Foreign Application Priority Data

Sep. 12, 2006 (JP) .................................. 2006-247402

(51) Int. Cl.
*G06F 3/12* (2006.01)

(52) U.S. Cl.
USPC ......... 358/1.15; 358/1.16; 358/402; 358/403; 358/407

(58) Field of Classification Search
USPC ................ 358/1.15, 1.16, 402, 403, 405, 407
See application file for complete search history.

(56) References Cited

U.S. PATENT DOCUMENTS

| | | | |
|---|---|---|---|
| 7,532,340 B2 * | 5/2009 | Koppich et al. | 358/1.15 |
| 2002/0067514 A1 | 6/2002 | Izumi et al. | |
| 2002/0133564 A1 * | 9/2002 | Takayama | 709/217 |
| 2005/0063003 A1 * | 3/2005 | Mishima et al. | 358/1.15 |
| 2005/0174592 A1 * | 8/2005 | Iinuma et al. | 358/1.13 |
| 2005/0174593 A1 * | 8/2005 | Piersol et al. | 358/1.13 |
| 2006/0064297 A1 * | 3/2006 | Sugishita et al. | 703/24 |
| 2006/0190496 A1 * | 8/2006 | Tsunoda | 707/200 |
| 2006/0265242 A1 * | 11/2006 | Kashioka | 705/1 |
| 2007/0071194 A1 * | 3/2007 | Nogawa | 379/100.17 |

FOREIGN PATENT DOCUMENTS

| | | |
|---|---|---|
| JP | 08-202607 A | 8/1996 |
| JP | 2000-354126 | 12/2000 |
| JP | 2002-009933 | 1/2002 |
| JP | 2004-112798 | 4/2004 |
| JP | 2004-186823 A | 7/2004 |
| JP | 2004-280607 A | 10/2004 |
| JP | 2006-041655 A | 2/2006 |

* cited by examiner

*Primary Examiner* — King Poon
*Assistant Examiner* — Jamares Q Washington
(74) *Attorney, Agent, or Firm* — Buchanan Ingersoll & Rooney PC

(57) ABSTRACT

An MFP makes an inquiry about a subfolder of a destination folder by referring to the destination folder of image data registered in an address book of the MFP. A PC transmits a subfolder list to the MFP. The MFP determines whether or not the transmitted subfolder is already registered in the address book, and the MFP automatically registers an unregistered subfolder as the destination folder in the address book.

12 Claims, 13 Drawing Sheets

FIG.5A

| DESTINATION NUMBER | DESTINATION TYPE | DESTINATION INFORMATION | LINK |
|---|---|---|---|
| 1 | SMB | ¥¥PC31A¥Photo : Account : Password | — |
| 2 | FTP | ftp:¥¥PC31A¥Manual : Account : Password | — |
| 3 | SMB | ¥¥PC31B¥Job : Account : Password | — |

FIG.5B

| DESTINATION NUMBER | DESTINATION TYPE | DESTINATION INFORMATION | LINK |
|---|---|---|---|
| 1 | SMB | ¥¥PC31A¥Photo : Account : Password | — |
| 2 | FTP | ftp:¥¥PC31A¥Manual : Account : Password | — |
| 3 | SMB | ¥¥PC31B¥Job : Account : Password | 5, 6 |
| 5 | SMB | ¥¥PC31B¥Job¥January2006 : Account : Password | — |
| 6 | SMB | ¥¥PC31B¥Job¥February2006 : Account : Password | — |

FIG.7

| DESTINATION NUMBER | DESTINATION TYPE | DESTINATION INFORMATION | DELETE TIME AND DATE |
|---|---|---|---|
| 4 | SMB | ¥¥PC31B¥Job¥NewYear : Account : Password | 2006/01/14 15:06:22 |

¥¥PC31B¥Job  ← EXISTING IN DELETE LIST
¥¥PC31B¥Job¥NewYear
¥¥PC31B¥Job¥January2006
¥¥PC31B¥Job¥February2006

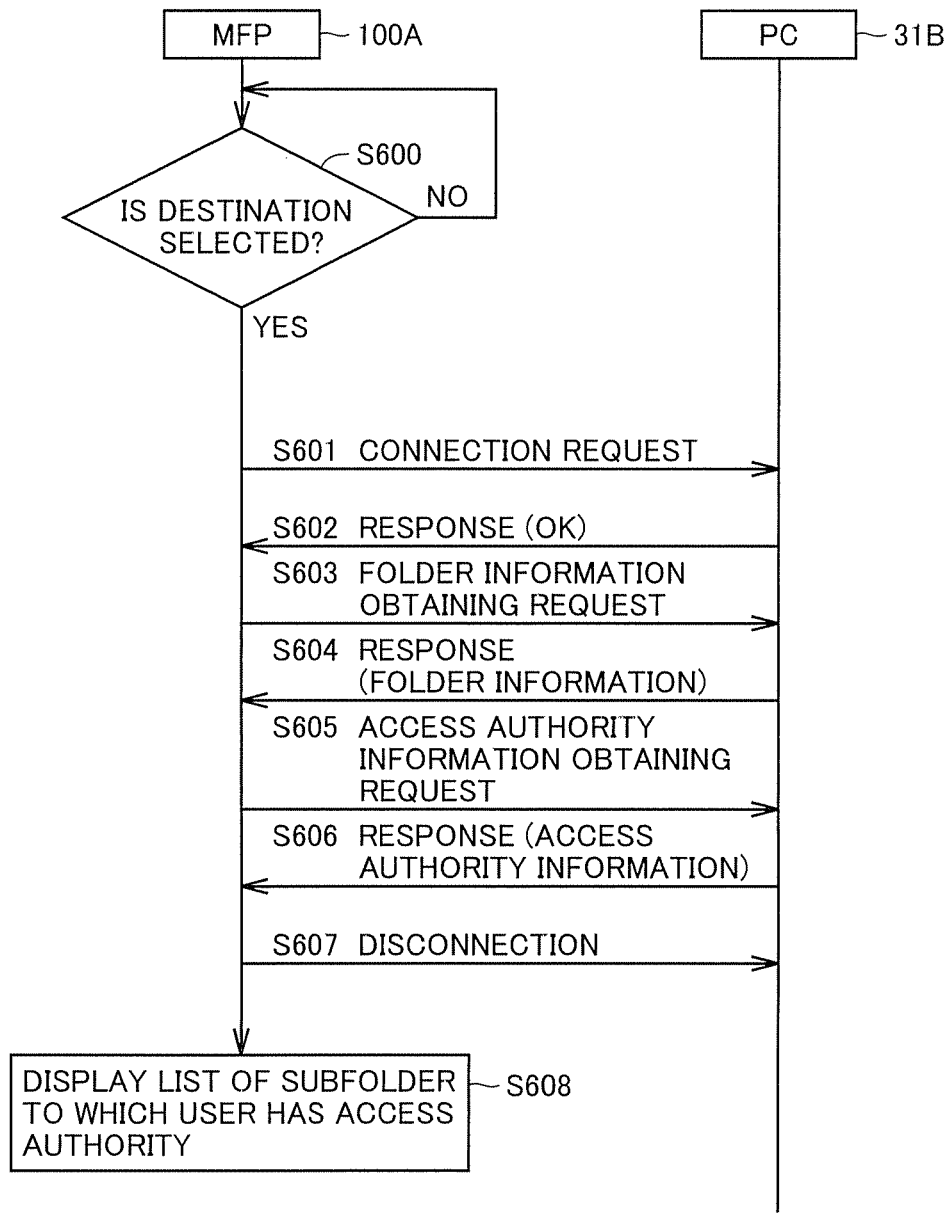

IMAGE PROCESSING APPARATUS, IMAGE PROCESSING SYSTEM, AND PROGRAM FOR SPECIFYING DESTINATIONS FOR IMAGE DATA TRANSMISSION

This application is based on Japanese Patent Application No. 2006-247402 filed with the Japan Patent Office on Sep. 12, 2006, the entire content of which is hereby incorporated by reference.

BACKGROUND OF THE INVENTION

1. Field of the Invention

The present invention relates to an image processing apparatus, an image processing system, and a program, particularly to an image processing apparatus, an image processing system, and a program that have a function of specifying a destination to transmit image data to an external device.

2. Description of the Related Art

Conventionally, there is known a configuration in which image data and document data read by an image processing apparatus such as a digital multifunction peripheral can be transmitted to and stored in a folder of an external device such as a computer connected via a network.

For example, in the configuration disclosed in Japanese Laid-Open Patent Publication No. 2004-280607, when image data is transmitted from a digital multifunction peripheral, the presence or absence of a shared folder is searched and displayed for all the computers connected via a network, user selection from among the shared folder is received, and the image data is transmitted to the selected folder.

In the configuration disclosed in Japanese Laid-Open Patent Publication No. 2004-186823, when document data read by the image processing apparatus is stored, the image data is transmitted to a folder previously set and registered in the image processing apparatus out of the folders of computers connected via the network.

The configuration of Japanese Laid-Open Patent Publication No. 2004-280607 is convenient because all the folders to which the data can be transmitted can be recognized by the search. However, as the number of connected computers increases, the search time becomes longer, and a time lag occurs until the folder to which the data can be transmitted is displayed. As a result, a user is kept waiting for a long time, or the user may feel uncomfortable.

It is well expected that many folders that are set to be shared not for the purpose of receiving the image data from the image processing apparatus but for other purposes are included in the shared folders of the connected computers. However, in the configuration of Japanese Laid-Open Patent Publication No. 2004-280607, since all the shared folders are searched and displayed including those as mentioned above, a considerable time may be required not only for the search but also for the user selection of the destination folder following the search.

On the other hand, in the configuration of Japanese Laid-Open Patent Publication No. 2004-186823, since the folder to which the data can be transmitted is previously set and registered, it is advantageous in that the folder to which the data can be transmitted is recognized within a short time, and the folder that is not used to receive document data will not be a candidate of a destination.

In order to classify and store the received data, a user of a computer frequently creates a subfolder categorized by type and use to the folder for receiving the transmission. In such cases, in the configuration of Japanese Laid-Open Patent Publication No. 2004-186823, the user must go through a cumbersome task because it will become necessary that a new destination is additionally registered at the side of the image processing apparatus to perform the transmission to the new folder. In order to set and register a destination, it is typically necessary to manually input a name and an IP address of the destination computer, and a folder structure (directory structure), which forces troublesome operations to the user.

Both in Japanese Laid-Open Patent Publication Nos. 2004-280607 and 2004-186823, it is necessary to search and register the destination with respect to each image processing apparatus, and therefore efficiency becomes worsened in a case where a plurality of image processing apparatuses are connected.

SUMMARY OF THE INVENTION

In view of the foregoing, an object of the present invention is to provide an image processing apparatus, an image processing system, and a program, capable of enhancing usability by configuring the image processing apparatus having a function of transmitting image data to an external device to easily recognize the destination.

An image processing apparatus according to a first aspect of the present invention includes an image reading unit to read an original image to obtain image data, a transmission unit to transmit the image data to an external device; an address book holding unit to hold information on an address book in which a destination folder of the external device to which the transmission unit performs the transmission is registered, a subfolder obtaining unit to obtain information on a subfolder of the destination folder registered in the address book; and an address book updating unit to additionally register a subfolder in the address book when the subfolder obtaining unit obtains the information on the subfolder.

In the configuration described above, when a subfolder is newly created in the destination folder registered in the address book, a task for registering the subfolder in the address book is eliminated, and the usability improves.

It may be configured that the image processing apparatus and the external device are connected via a network.

The subfolder obtaining unit may refer to contents of the address book to make an inquiry about a status of the subfolder to the external device.

It may also be configured that the subfolder obtaining unit obtains the information on the subfolder of the folder by receiving an instruction for additional registration into an address book a folder provided in an information processing apparatus from the information processing apparatus connected to the image processing apparatus.

The image processing apparatus preferably includes an interface that can be connected to another image processing apparatus; and a subfolder notification unit to notify the another image processing apparatus of information on a subfolder when the subfolder obtaining unit obtains the information on the subfolder. Therefore, the task of registering in the address book is simplified and thus the usability improves when a plurality of image processing apparatuses are connected.

It may also be configured that the image processing apparatus further includes a destination specifying unit to specify a destination folder, and when the destination folder is specified by the destination specifying unit, the subfolder obtaining unit makes an inquiry about the subfolder of the destination folder to the external device corresponding to the specified destination folder.

Preferably the image processing apparatus further includes a deleted folder information holding unit to hold information on the destination folder deleted from the address book, and the address book updating unit does not add to the address book the subfolder whose information is held by the deleted folder information holding unit.

Preferably the image processing apparatus further includes a user identifier obtaining unit to obtain a user identifier; a folder specification receiving unit to receive an input by a user for specifying a destination folder; a display unit to display a list of the subfolder; and a subfolder selection receiving unit to receive selection of a subfolder from the subfolder displayed on the display unit, and when the folder specification receiving unit receives the input for specification, the subfolder obtaining unit obtains information on the subfolder of the specified destination folder to cause the display unit to display the information on the subfolder.

It may be configured that the address book updating unit does not update the address book when the user does not have an authority to update the address book.

It may also be configured that only a subfolder to which the user has an access authority is displayed on the display unit.

According to another aspect of the present invention, a first image processing system is provided in which a first image processing apparatus and a second image processing apparatus are connected via a network, wherein the first image processing apparatus includes: an image reading unit to read an original image to obtain image data; a first transmission unit to transmit the image data to an external device, a first address book holding unit to hold information on a first address book in which a destination folder of the external device is registered; and a destination folder information transmission unit to transmit the information on the destination folder to the second image processing apparatus when a new destination folder is registered in the first address book, and the second image processing apparatus includes: a second transmission unit to transmit the image data to an external device; a second address book holding unit to hold information on a second address book in which a destination folder of the external device is registered; a new destination determination unit to determine whether or not a destination folder is registered in the second address book when the information on the destination folder transmitted from the destination folder information transmission unit is received; and an address book updating unit to add the destination folder to the second address book when the new destination determination unit determines that the destination folder is not registered in the second address book.

According to still another aspect of the present invention, an image processing system is provided in which a first image processing apparatus and a second image processing apparatus are connected via a network, wherein the first image processing apparatus includes: an image reading unit to read an original image to obtain image data; a first transmission unit to transmit the image data to an external device; a first address book holding unit to hold information on a first address book in which a destination folder of the external device is registered; and a destination folder information transmission unit to transmit the information on the destination folder to the second image processing apparatus, and the second image processing apparatus includes: a second transmission unit to transmit the image data to an external device; a second address book holding unit to hold information on a second address book in which a destination folder of the external device is registered; an address book information transmission unit to transmit the second address book to the first image processing apparatus in response to a request of the first image processing apparatus; and an address book updating unit to add a destination folder to the second address book when the information on the destination folder transmitted from the destination folder information transmission unit is received. The destination folder information transmission unit extracts a destination that is registered in the first address book but not registered in the second address book, and transmits the extracted destination to the second image processing apparatus, when the second address book transmitted by the address book information transmission unit is received.

According to still another aspect of the present invention, there is provided a computer readable medium storing a program that runs on a processor included in an image processing apparatus, and the program causes the processor to execute processing comprising: obtaining information on a subfolder of a destination folder registered in an address book to which a destination folder of image data is registered; and additionally registering a subfolder in the address book when the information on the subfolder is obtained in the subfolder obtaining processing.

According to the above configurations, even when a subfolder is newly created in the destination, the new subfolder can easily be recognized, and the usability improves.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B show examples of contents of an address book.

FIG. 7 shows one example of contents of a delete list.

FIG. 14 is a sequence diagram for explaining one example of process contents in a fifth embodiment.

DESCRIPTION OF THE PREFERRED EMBODIMENTS

Referring to the accompanying drawings, preferred embodiments of the present invention will be described below. In the following description, an MFP (Multifunction Peripheral) is taken as an example of the device to which an image processing apparatus according to the present invention is applied.

First Embodiment (1) Configuration of Image Data Transmission System

Figure 1:
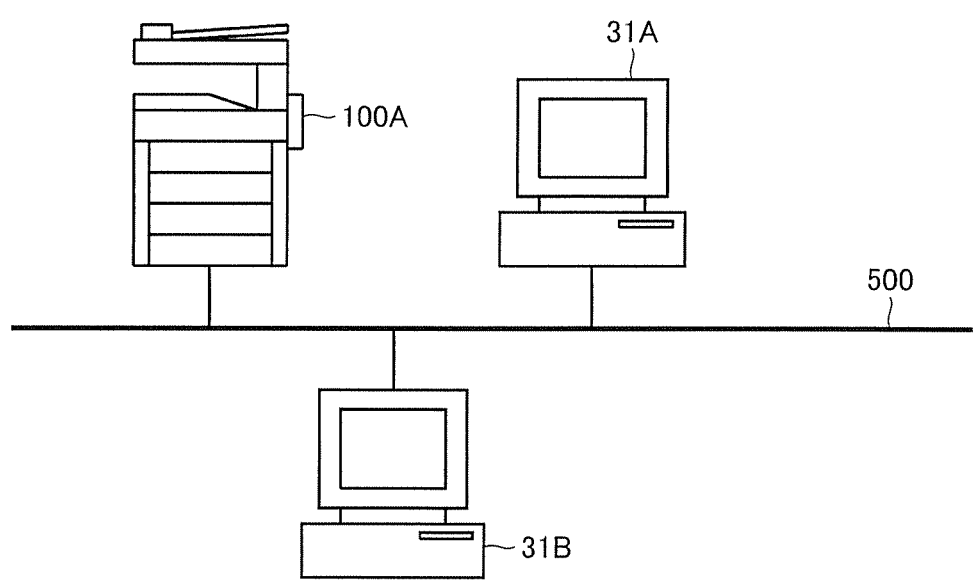
FIG. 1 shows one example of an entire configuration of an image data transmission system according to a first embodiment of the present invention.

FIG. 1 shows one example of an entire configuration of an image data transmission system according to a first embodiment of the present invention. In the image data transmission system, an MFP 100A of the first embodiment and PCs 31A and 31B are connected to one another via a network 500 such as LAN.

MFP 100A has a scanner function, and can transmit image data obtained by reading an original image with the scanner to a folder of PC 31A or PC 31B over network 500. Examples of a protocol used in the transmission of image data include FTP (File Transfer Protocol) and SMB (Server Message Block). MFP 100A also has an address book function, and can select a destination folder from those previously registered in the address book to transmit the image data.

(2) Configuration of MFP 100A

Figure 2:
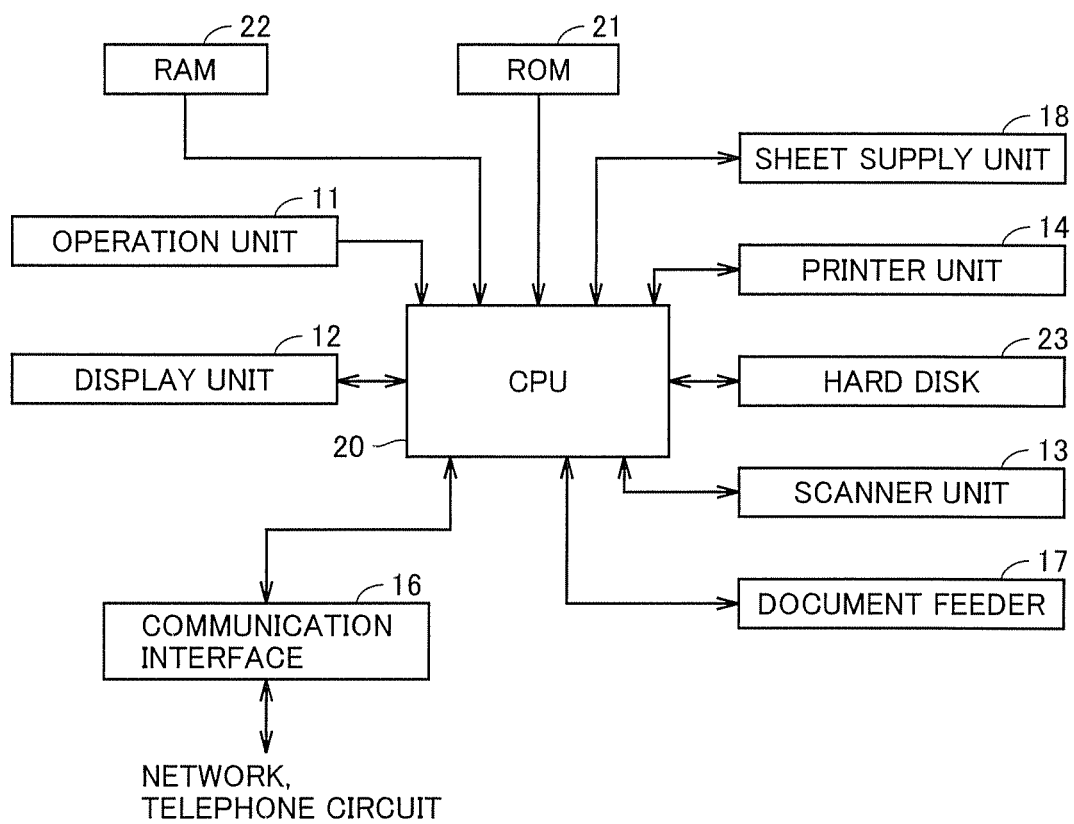
FIG. 2 shows one example of a hardware configuration of an MFP.
Figure 3:
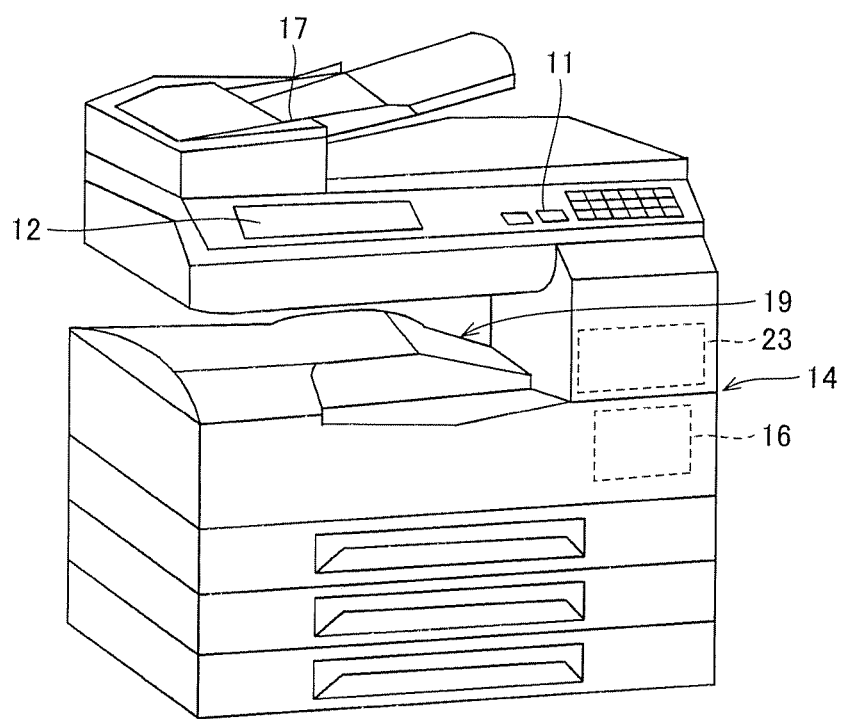
FIG. 3 shows one example of an appearance of the MFP.

FIG. 2 shows one example of a hardware configuration of MFP 100A, and FIG. 3 shows one example of an appearance of MFP 100A. As shown in FIG. 2, MFP 100A includes an operation unit 11, a display unit 12, a scanner unit 13, a printer unit 14, a communication interface 16, a document feeder 17, a sheet supply unit 18, a CPU 20, a ROM 21, a RAM 22, and a hard disk 23.

Operation unit 11 includes a plurality of keys for inputting a numerical character, a character, and a symbol, a sensor for recognizing pressing of the key, and a transmitting circuit for transmitting a signal indicating the recognized key to CPU 20.

Display unit 12 displays a screen for displaying a message to a user, a screen for the user inputting setting contents or processing contents, and a screen for displaying a result of a process performed by MFP 100A is displayed. In the first embodiment, a touch panel is used as display unit 12, and the touch panel is included in operation unit 11 in terms of function. The touch panel detects a position on the touch panel on which the user touches with finger, and transmits a signal indicating a result of the detection to CPU 20.

Scanner unit 13 irradiates light on a document and detects reflected light to read an image drawn on the document, and thereby scanner unit 13 generates digital image data (here, concentration data indicating concentration of RGB or black). The image data thus obtained is used in printer unit 14 for printing, and also the image data is converted into a file having a format such as TIFF, PDF, and JPEG and stored in hard disk 23. Sometimes the image data is converted into facsimile data and used for facsimile transmission. In the present embodiment, the image data obtained by reading the document with scanner unit 13 can be transmitted to external devices such as PCs 31A and 31B pursuant to FTP (Scan to FTP) or SMB (Scan to SMB). Document feeder 17 is provided in an upper portion of the main body of MFP 100A, and is used to sequentially feed one or a plurality of documents to scanner unit 13.

Printer unit 14 prints the image read with scanner unit 13, the image of data transmitted from the external device such as PC 31A connected via the network such as LAN 500, or the image of facsimile data received by a facsimile, on a recording sheet made of a material such as paper or film. Sheet supply unit 18 is provided in a lower portion of the main body of MFP 100A, and is used to supply recording sheet suitable for the image to be printed to printer unit 14. The recording sheet on which the image is printed with printer unit 14 is discharged to a tray 19 (see FIG. 3).

Communication interface 16 is a device for performing communication with the external device such as PC over the network, and for performing facsimile transmission and reception via a telephone circuit. For example, an NIC (Network Interface Card), a modem, and a TA (Terminal Adaptor) are used as communication interface 16.

Programs and data are stored in ROM 21 to realize basic functions of MFP 100A such as image reading (scan), document duplicating (copy), facsimile data transmission and reception, network printing, and document server (box function). Programs and data to realize functions of the present embodiment are also stored in ROM 21.

A part or the whole of the programs and data may be installed in hard disk 23. In this case, the programs and data installed in hard disk 23 are loaded on RAM 22 if needed. The functions described in the present embodiment are not always realized by CPU 20, and sometimes the functions are realized by using dedicated hardware such as a DSP (Digital Signal Processor) and an ASIC (Application Specific Integrated Circuit). The functions are possibly realized by using a function of general-purpose program such as an operating system (OS).

(3) Process Contents of MFP 100A

Figure 4:
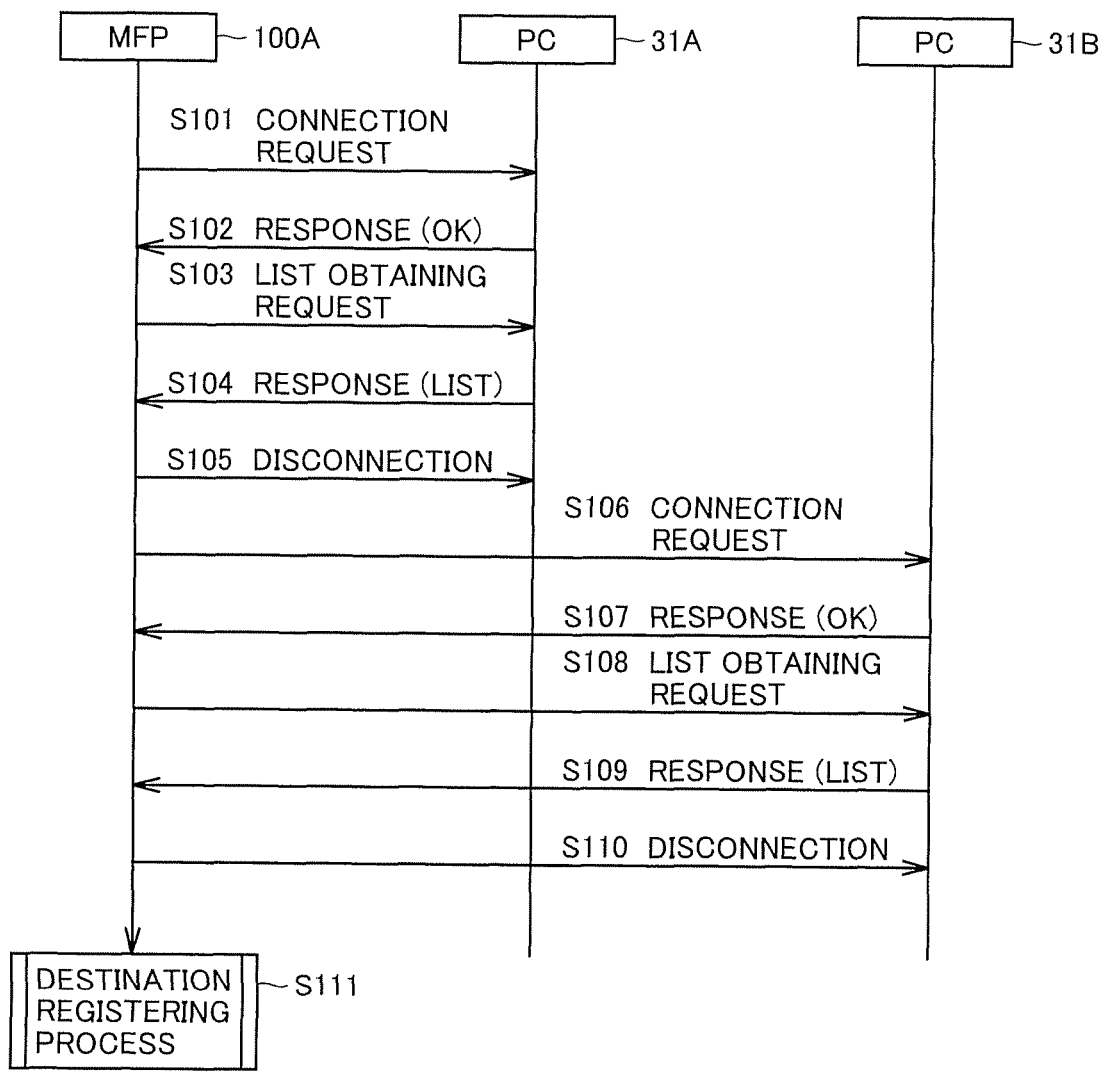
FIG. 4 is a sequence diagram for explaining one example of process contents in the first embodiment.

Then, process contents of MFP 100A in the present embodiment will be described. The program stored in ROM 21 runs on CPU 20 to realize the following processes. FIG. 4 is a sequence diagram for explaining an example of the process contents in the present embodiment.

In the present embodiment, MFP 100A makes an inquiry about new creation of the subfolder to PC 31A and PC 31B. That is, MFP 100A issues a request for network connection to PC 31A (S101), and PC 31A responds to the request to establish the connection (S102).

Next, MFP 100A makes a request for obtaining a subfolder list to PC 31A (S103). In making the request for obtaining a subfolder list, MFP 100A refers to an address book stored in hard disk 23 of MFP 100A. FIGS. 5A and 5B show examples of contents of the address book. MFP 100A refers to data registered in the address book to transmit a folder name of a parent folder registered in the address book to PC 31A, and issues a request to transmit a list of the subfolder of each parent folder.

PC 31A transmits the subfolder list in response to the request from MFP 100A (S104). When MFP 100A receives the folder list, MFP 100A disconnects the connection to PC 31A (S105). In the present embodiment, the address book is individually stored for each protocol (FTP or SMB) used in file transmission, and the inquiry is individually made for each protocol even to the same PC. This is to comply with the case where the access based on FTP differs from the access based on SMB in an account or a password. Alternatively, the inquiry may be made once for the same folder.

Subsequent to PC 31A, MFP 100A issues a request for network connection to PC 31B (S106), and PC 31B responds to the request for network connection to establish the connection (S107). As with PC 31A, MFP 100A issues a request to PC 31B for obtaining a subfolder list (S108). PC 31B transmits the subfolder list in response to the request from MFP 100A (S109). When MFP 100A receives the subfolder list, MFP 100A disconnects the connection to PC 31B (S110).

Figure 6:
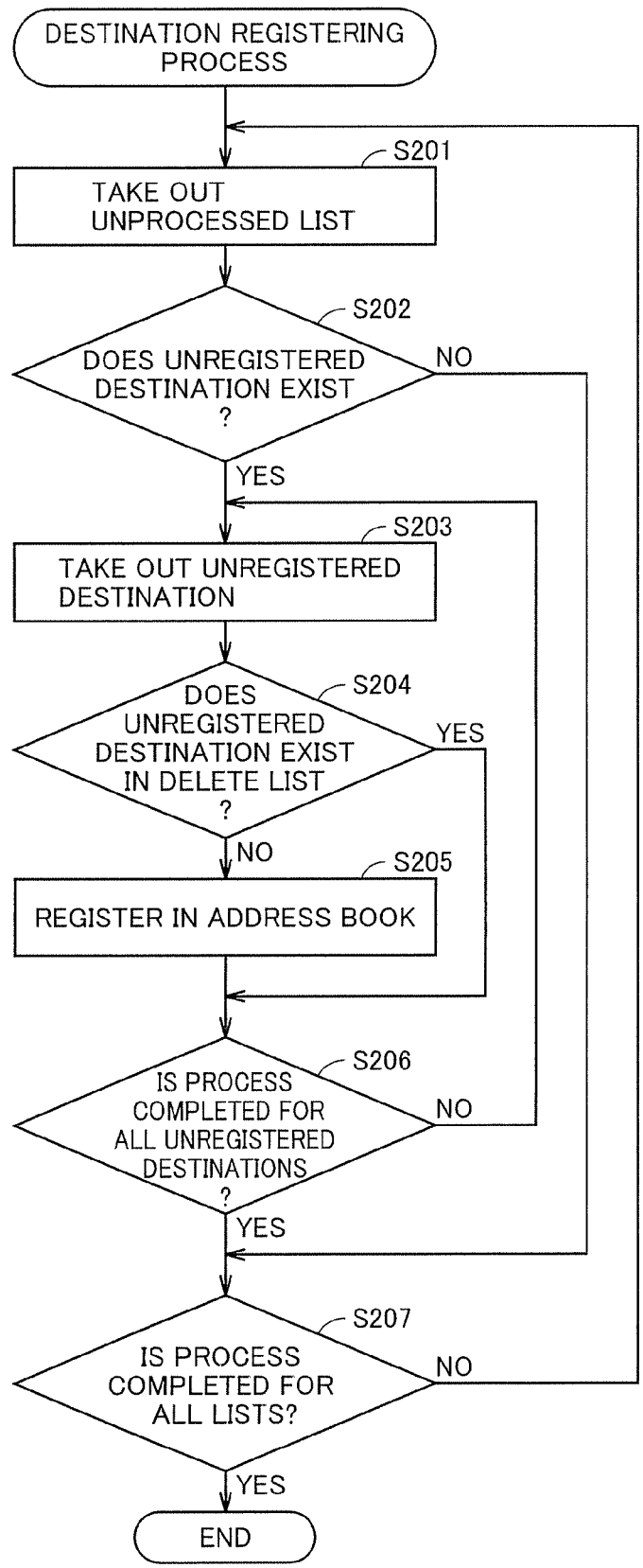
FIG. 6 is a flowchart for explaining one example of contents of a destination registering process in the MFP of the first embodiment.

When MFP 100A receives the subfolder lists transmitted from PCs, MFP 100A performs a destination registering process (S111). FIG. 6 is a flowchart for explaining an example of contents of the destination registering process in MFP 100A.

In MFP 100A, one of unprocessed subfolder lists is taken out (S201). When an unregistered destination does not exist (NO in S202), the next unprocessed list is taken out (S201) unless the process is performed for all the lists (NO in S207).

When the unregistered destination exists (YES in S202), one unregistered destination is taken out (S203), and it is determined whether or not the taken-out unregistered destination is identical with the destination existing in the delete list (S204). The destination stored in the delete list is the destination that is deleted, although registered in the address book once. FIG. 7 shows an example of contents of the delete list.

In the present embodiment, when the destination is identical with the destination existing in the delete list (YES in S204), the destination is not registered in the address book (S205). This is attributed to the fact that a need of automatic re-registration rarely arise for the folder deleted once. However, a confirmation message as to whether or not the folder should be re-registered can be displayed, and the display and non-display of the confirmation message can be switched depending on elapsed time since the time and date when the folder is deleted. The number of deleted times is held and the display and non-display of the confirmation message can be switched depending on the number of deleted times.

In the present embodiment, when the subfolder is automatically registered (S205), the "link" field of FIG. 5 is updated. The link field is added as an attribute of the parent folder of the subfolder when the subfolder is automatically registered, and a destination number of the automatically registered subfolder is stored in the link field. The destination number of the parent folder can also be held on the subfolder side.

When the destination registering process is completed for all the unregistered destinations (YES in S206), and the process is completed for all the lists (YES in S207), the destination registering process ends.

Figures 8, 9:
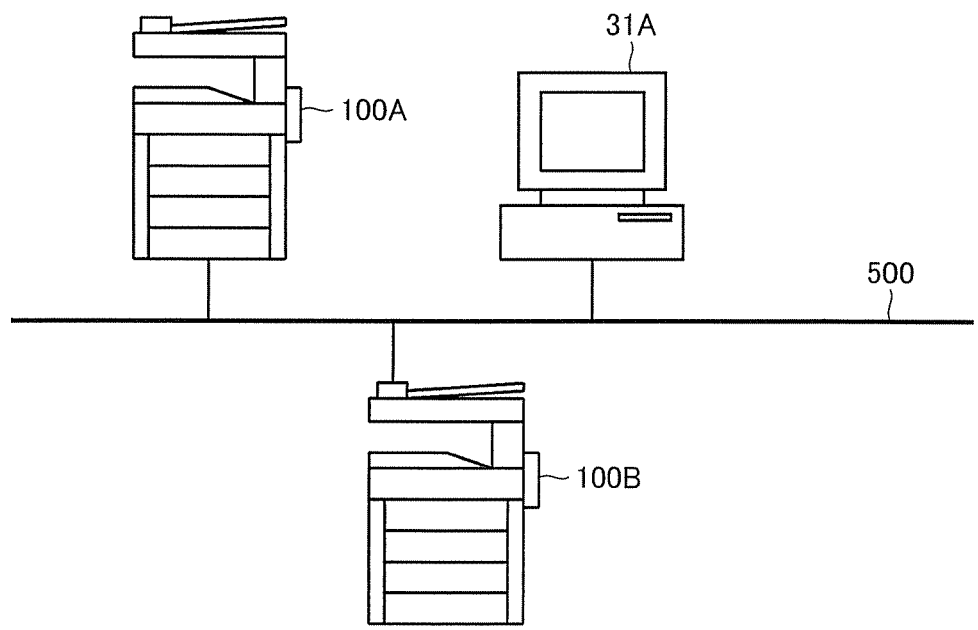
FIG. 8 shows one example of contents of a subfolder list.
FIG. 9 shows one example of an entire configuration of an image data processing system according to a second embodiment of the present invention.

In the state where only destination numbers "1", "2", and "3" shown in FIG. 5A exist, a name of "¥Job" which is of a top-level folder is transmitted to PC 31B, and a subfolder list shown in FIG. 8 is transmitted. That is, in response to the transmission of the name "¥Job", PC 31B transmits "¥NewYear", "¥January2006", and "¥February2006" which are of subfolder names of the "¥Job" folder to MFP 100A. Based on this, MFP 100A adds "¥Job¥January2006" and "¥Job¥February2006" to the list as destination numbers "5" and "6", as shown in FIG. 5B. "5 and 6" are added to the link field of the destination number "3" in order to indicate that these destinations are the subfolders of "¥Job". As shown in FIG. 7, a subfolder of "¥NewYear" is not registered because it exists in the delete list.

As described above, when a subfolder that is not registered in the address book is newly created on the side of the external device such as PC 31A, the new subfolder is automatically registered in the address book, so that the task for registering the destination in the address book is eliminated, and the usability improves.

Second Embodiment

A second embodiment according to the present invention will be described below. Although the request for transmitting subfolder list is made from the side of MFP 100A to each external device such as PC 31A in the first embodiment, sometimes the registration in the address book of MFP 100A is performed by executing a program installed in PC 31A or the like. Such cases will be described in the second embodiment.

FIG. 9 shows an example of an entire configuration of an image data processing system according to a second embodiment of the present invention. In the configuration of the second embodiment, MFP 100A, MFP 100B, and PC 31A are connected to one another via network 500. In the second embodiment, it is assumed that MFP 100A and MFP 100B have substantially the same hardware configuration.

A program for registering a new address in the address book of MFP 100A is installed in PC 31A. Although the new address can be registered in the address book of MFP 100B using the program, registering the new address in each MFP is troublesome for the user. In the second embodiment, the usability is improved by reflecting the new address registered in the MFP 100A on MFP 100B.

Figure 10:
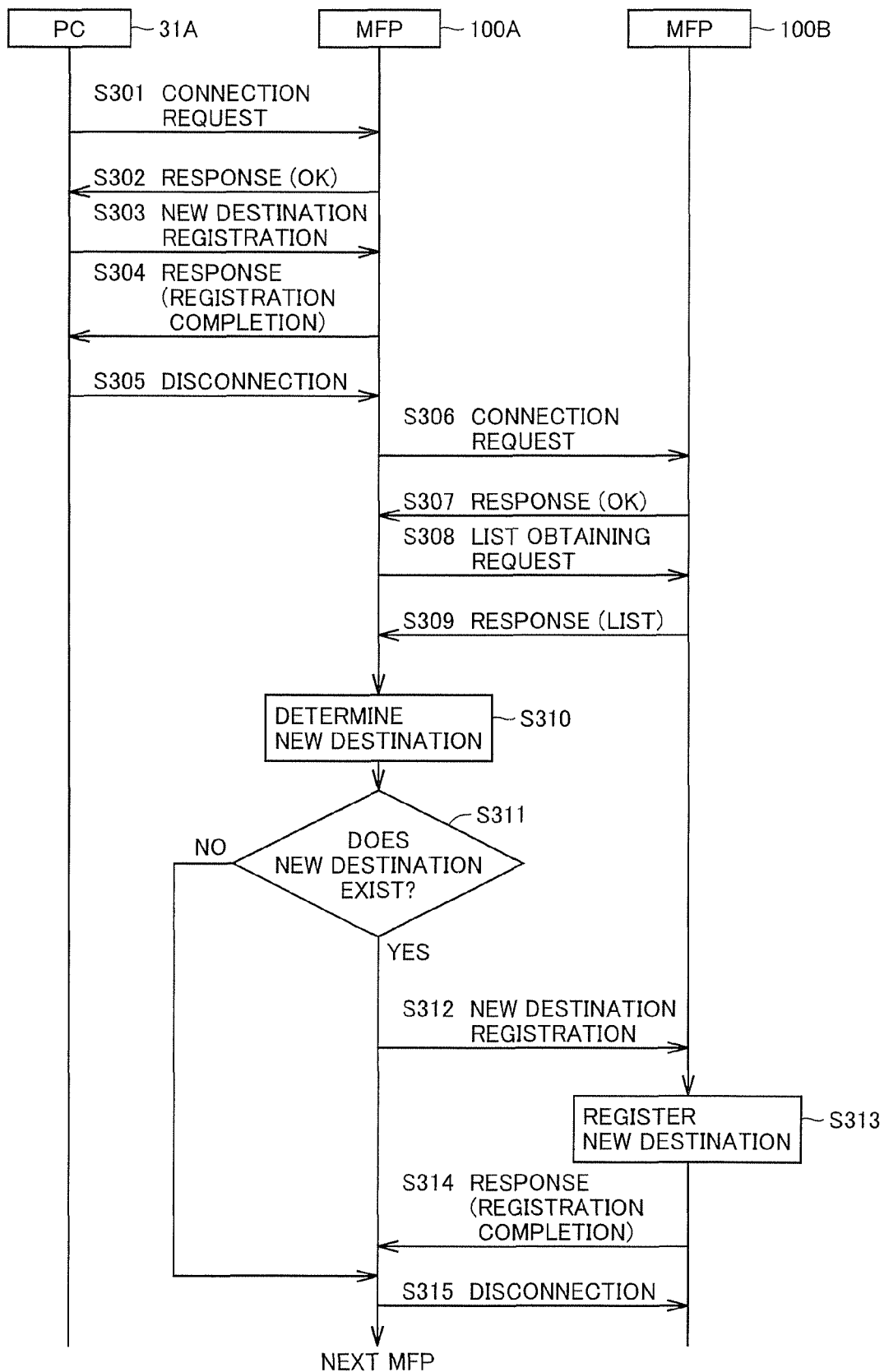
FIG. 10 is a sequence diagram for explaining one example of process contents in the second embodiment.

FIG. 10 is a sequence diagram for explaining process contents in the present embodiment. PC 31A issues a request for network connection to MFP 100A to register the address book (S301), and MFP 100A responds the request to establish the connection (S302).

Then, PC 31A makes a request for registering a new destination to MFP 100A (S303). The process is performed by executing the program installed in PC 31A. MFP 100A performs the new address registering process, and sends a response notifying that the registration is completed (S304). When PC 31A receives the response notifying the completion of the registration, PC 31A disconnects the connection to MFP 100A (S305).

In the present embodiment, MFP 100A in which the new destination is registered by PC 31A issues a connection request to MFP 100B connected to the same LAN 500 (S306). The information (for example, IP address) on the external device to which MFP 100A attempts connection is previously stored in a table in MFP 100A. An operator may perform storing in the table using the operation unit. In the same LAN, an IP address can automatically be obtained and stored by exchange of a broadcast packet.

MFP 100B responds to the connection request to establish the connection (S307). MFP 100A issues a request to MFP 100B for obtaining a list of the address book (S308). MFP 100B transmits the list of the address book in response to the request from MFP 100A (S309).

When MFP 100A receives the list of the address book, MFP 100A compares contents of the list with the destination newly registered by PC 31A, and MFP 100A determines whether or not the destination newly registered by PC 31A corresponds to the destination of the new subfolder in MFP 100B (S310). When it is not the new destination (NO in S311), MFP 100A disconnects the connection to MFP 100B (S314).

When it is the new destination (YES in S311), MFP 100A issues a request for registering the new destination to MFP 100B (S312). MFP 100B registers the new destination in the address book in response to the request from MFP 100A (S313), and MFP 100B sends a response notifying the completion of the registration to MFP 100A (S314). When MFP 100A receives the completion of the registration, MFP 100A disconnects the connection to MFP 100B (S315).

Through the above processes, it is not necessary for the user to individually register the destination in each MFP, so that the usability is improved. As with the first embodiment, it may be configured that a delete list is held in MFP 100B, and the destination existing in the delete list is not registered with respect to the request for registering new destination from MFP 100A.

Third Embodiment

Figure 11:
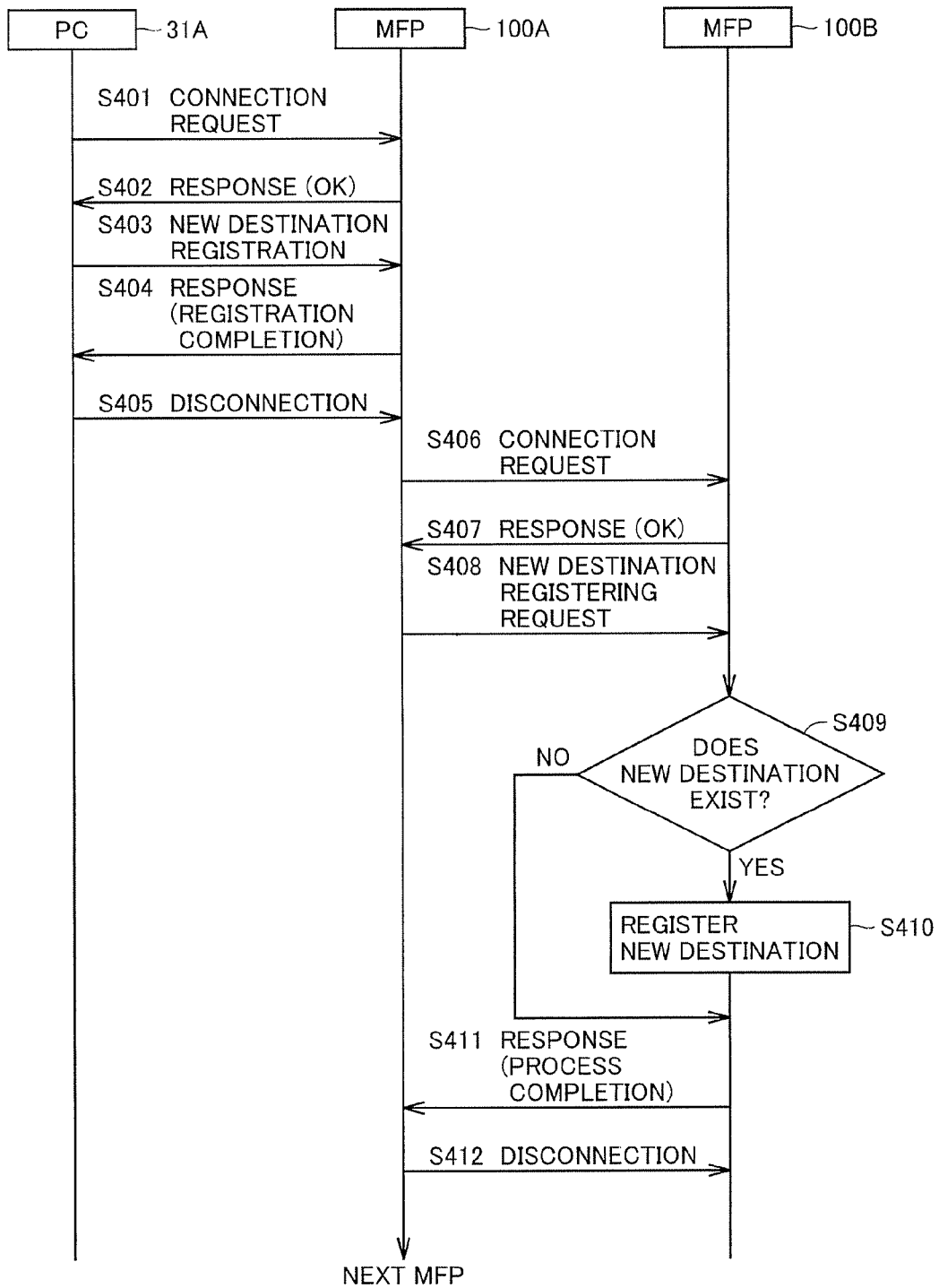
FIG. 11 is a sequence diagram for explaining one example of process contents in a third embodiment.

A third embodiment of the invention will be described below. As with the second embodiment, the case in which PC 31A registers the new destination into MFP 100A will be described in the third embodiment. FIG. 11 is a sequence diagram for explaining an example of process contents in the third embodiment. Steps S401 to S407 are similar to those of the second embodiment, so detailed description thereof is omitted.

In the third embodiment, unlike the second embodiment, MFP 100A issues a request for registering a new destination to MFP 100B irrespective of the contents of address book registration of MFP 100B (S408). MFP 100B compares the transmitted destination with the address book of MFP 100B. When a new destination exists (YES in S409), the new destination is registered in the address book (S410).

Then, MFP 100B sends a response notifying the completion of the process to MFP 100A (S411). Even when the new destination does not exist (NO in S409), and the registration process is not performed (NO in S409), MFP 100B similarly sends a response notifying the completion of the process to MFP 100A (S411). When MFP 100A receives the response from MFP 100B, MFP 100A disconnects the connection to MFP 100B (S412).

As with the above embodiments, it may be configured that a delete list is held in MFP 100B, and the destination existing in the delete list is not registered with respect to the request for registering new destination from MFP 100A. In the first embodiment, only one MFP registers the new address in the address book. However, in the same manner as in the second and third embodiments, the new address can also be registered in the address book of another MFP.

Fourth Embodiment

Figure 12:
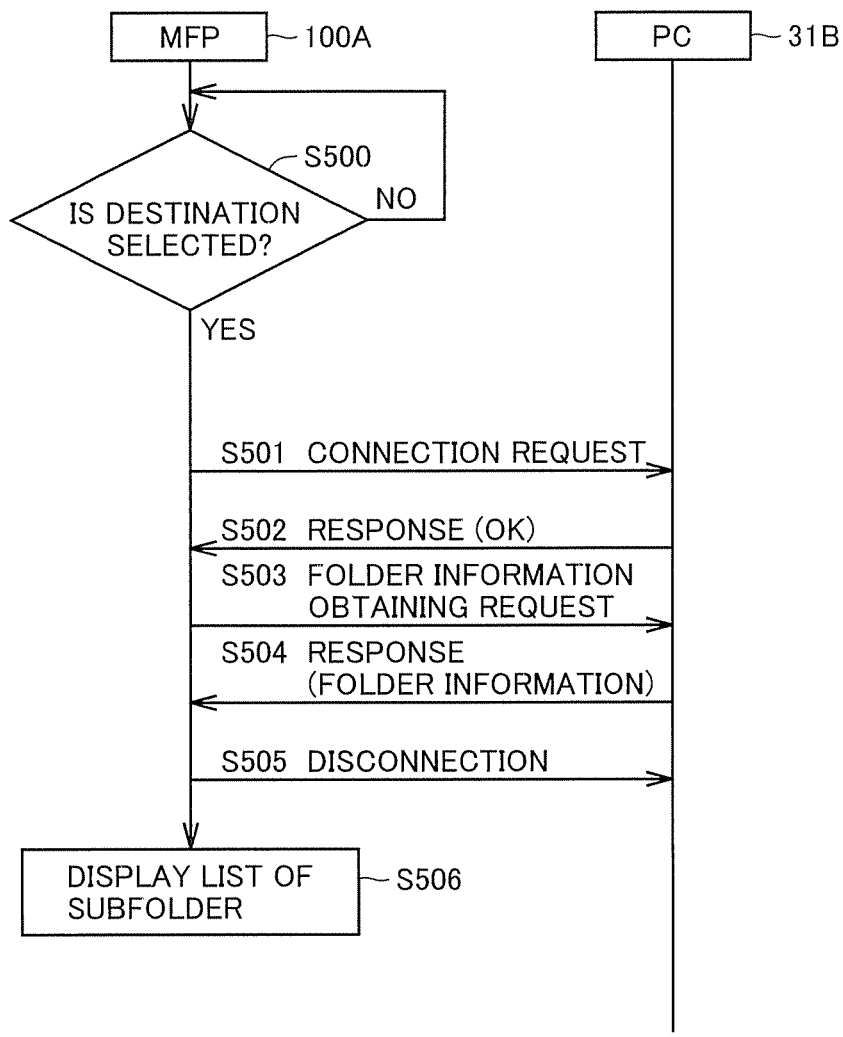
FIG. 12 is a sequence diagram for explaining one example of process contents in a fourth embodiment.

A fourth embodiment of the present invention will be described below. The case in which the authority for new registration to the address book is not given to, e.g., a login user of MFP 100 in MFP 100A will be described in the fourth embodiment. FIG. 12 is a sequence diagram for explaining process contents in the fourth embodiment.

Figure 13:
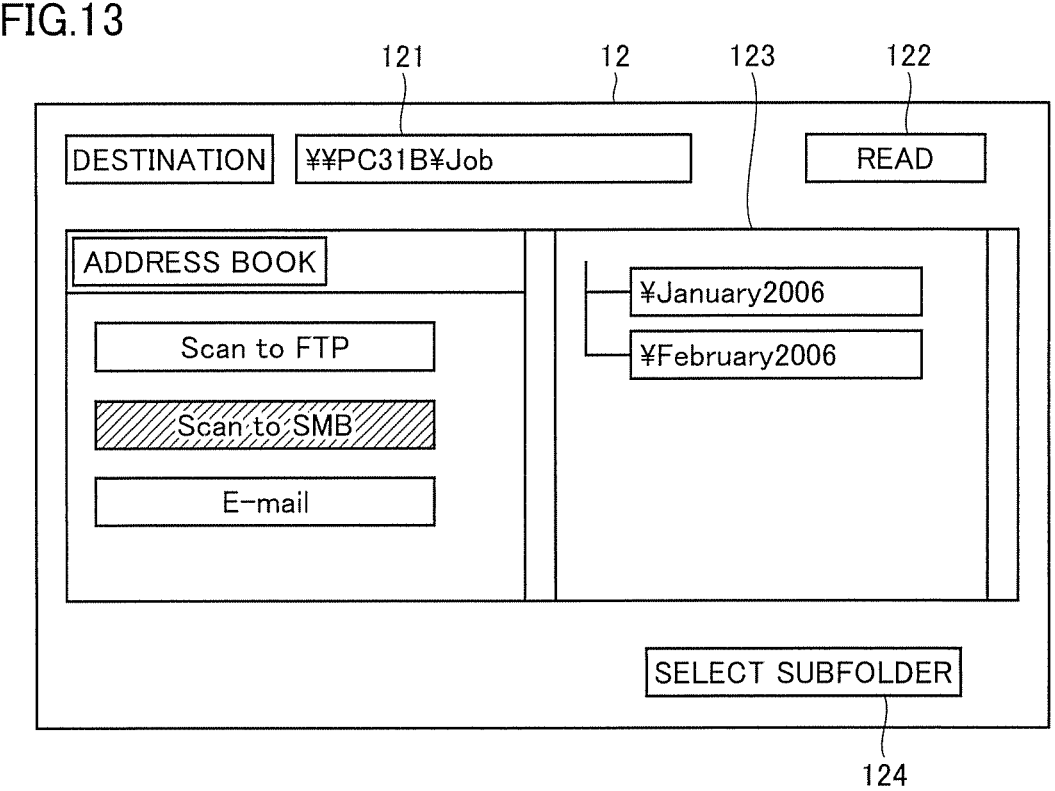
FIG. 13 shows one example of a screen displayed on a display unit of an MFP in the fourth embodiment.

Referring to FIGS. 12 and 13, the fourth embodiment will be described. FIG. 13 shows an example of a screen displayed on display unit 12 of MFP 100A in the present embodiment. In MFP 100A, the user selects "Scan to FTP (image data obtained by reading a document with scanner unit 13 is transmitted to the external device using the FTP protocol)" or "Scan to SMB (image data obtained by reading a document with scanner unit 13 is transmitted to the external device using the SMB protocol)" in the address book, specifies a destination (parent folder) in a destination specifying region 121, and presses a read button 122 (YES in S500). MFP 100A issues a request for connection to PC 31B corresponding to the selected destination (S501), and PC 31B responds to the request to establish the connection (S502).

Then, MFP 100A issues a request to PC 31B for transmission of folder information (S503). At this point, the name of the selected folder is transmitted. In response to the request from MFP 100A, PC 31B transmits a subfolder list as the folder information on the selected folder (S504). When MFP 100A receives the folder information, MFP 100A disconnects the connection to PC 31B (S505).

MFP 100A displays a list of subfolder in a subfolder display region 123 of FIG. 13 based on the subfolder list. The user selects a subfolder from among the displayed subfolders and presses a subfolder selection button 124, and thereby the user can easily select the subfolder as the destination. However, in the present embodiment, the destination is not newly registered in the address book of MFP 100A because the user does not have the authority.

Fifth Embodiment

A fifth embodiment of the present invention will be described below. The case in which an access authority to a folder is set in the external device such as PC 31A will be described in the fifth embodiment. FIG. 14 is a sequence diagram for explaining an example of process contents in the fifth embodiment.

Steps S600 to S604 are similar to steps S500 to S504 in the fourth embodiment, so detailed description thereof is omitted. In the fifth embodiment, after MFP 100A obtains a subfolder list, MFP 100A transmits an identifier such as an ID of a login user to issue a request to obtain access authority information (S605). The access authority information is one that indicates the access authority to the folder for each user.

When PC 31B transmits the access authority information (S606), MFP 100A disconnects the connection to PC 31B (S607). MFP 100A displays a list of the subfolder to which the user has the access authority on subfolder display region 123 of FIG. 13 based on the subfolder list and the access authority information. The user selects a subfolder from among the displayed subfolders and presses subfolder selection button 124, and thereby the user can easily select the subfolder as the destination. When the user does not have the access authority to the parent folder, the subfolder is not displayed, but a message that the user does not have the access authority to the specified destination may be displayed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system comprising:
   a first image processing apparatus;
   and a second image processing apparatus connected with the first image processing apparatus via a network, wherein
   said first image processing apparatus includes:
   an image reading unit to read an original image to obtain image data;
   a first transmission unit to transmit said image data to an external device;
   a first address book holding unit to hold a first address book in which a destination folder of at least one external device is registered; and
   a destination folder information transmission unit to transmit, upon registering a new destination folder in said first address book, information regarding the new destination folder registered in said first address book to said second image processing apparatus, and
   said second image processing apparatus includes:
   a second transmission unit to transmit said image data to an external device;
   a second address book holding unit to hold a second address book in which a destination folder of at least one external device is registered;
   a new destination determination unit to determine, when the information regarding the new destination folder is received from said first image processing apparatus, if a destination folder, with respect to the received information, is already registered in said second address book held in said second image processing apparatus; and an address book updating unit to add a new destination folder to said second address book of said second image processing apparatus when said new destination determination unit determines that a destination folder, with respect to the received information, is not registered in the second address book.

2. The image processing system according to claim 1, wherein the first image processing apparatus and said external device are connected via a network.

3. The image processing system according to claim 1, further comprising a destination specifying unit to specify a destination folder, wherein when the destination folder is specified by said destination specifying unit, a subfolder obtaining unit makes an inquiry about subfolders of the destination folder to an external device corresponding to the specified destination folder.

4. The image processing system according to claim 1, further comprising a deleted folder information holding unit to hold information on destination folders deleted from said first address book.

5. The image processing system according to claim 1, wherein said address book updating unit does not update said second address book when a user does not have an authority to update said second address book.

6. The image processing system according to claim 1, wherein only a subfolder to which a user has an access authority is displayed on a display unit.

7. An image processing system comprising:
a first image processing apparatus; and
a second image processing apparatus connected with the first image processing apparatus via a network, wherein the first image processing apparatus includes:
  an image reading unit to read an original image to obtain image data;
  a first transmission unit to transmit said image data to an external device;
  a first address book holding unit to hold a first address book in which a destination folder of at least one external device is registered; and
  a destination folder information transmission unit to transmit information regarding a destination folder registered in said first address book to said second image processing apparatus, the second image processing apparatus includes:
  a second transmission unit to transmit said image data to an external device;
  a second address book holding unit to hold a second address book in which a destination folder of said external device is registered;
  an address book information transmission unit to transmit said second address book to said first image processing apparatus in response to a request of said first image processing apparatus; and
  an address book updating unit to add a new destination folder to said second address book when the information regarding the destination folder transmitted from said destination folder information transmission unit of said first image processing apparatus is received, wherein
  said destination folder information transmission unit of said first image processing apparatus extracts a destination that is registered in said first address book but not registered in said second address book, and transmits the extracted destination to said second image processing apparatus, when the second address book transmitted by said address book information transmission unit is received.

8. The image processing system according to claim 7, wherein the first image processing apparatus and said external device are connected via a network.

9. The image processing system according to claim 7, wherein said address book updating unit does not update said second address book when a user does not have an authority to update said second address book.

10. The image processing system according to claim 7, wherein only a subfolder to which a user has an access authority is displayed on a display unit.

11. The image processing system according to claim 7, further comprising a destination specifying unit to specify a destination folder, wherein when the destination folder is specified by said destination specifying unit, a subfolder obtaining unit makes an inquiry about subfolders of the destination folder to an external device corresponding to the specified destination folder.

12. The image processing system according to claim 7, further comprising a deleted folder information holding unit to hold information on destination folders deleted from said first address book.

* * * * *